Patented July 12, 1938

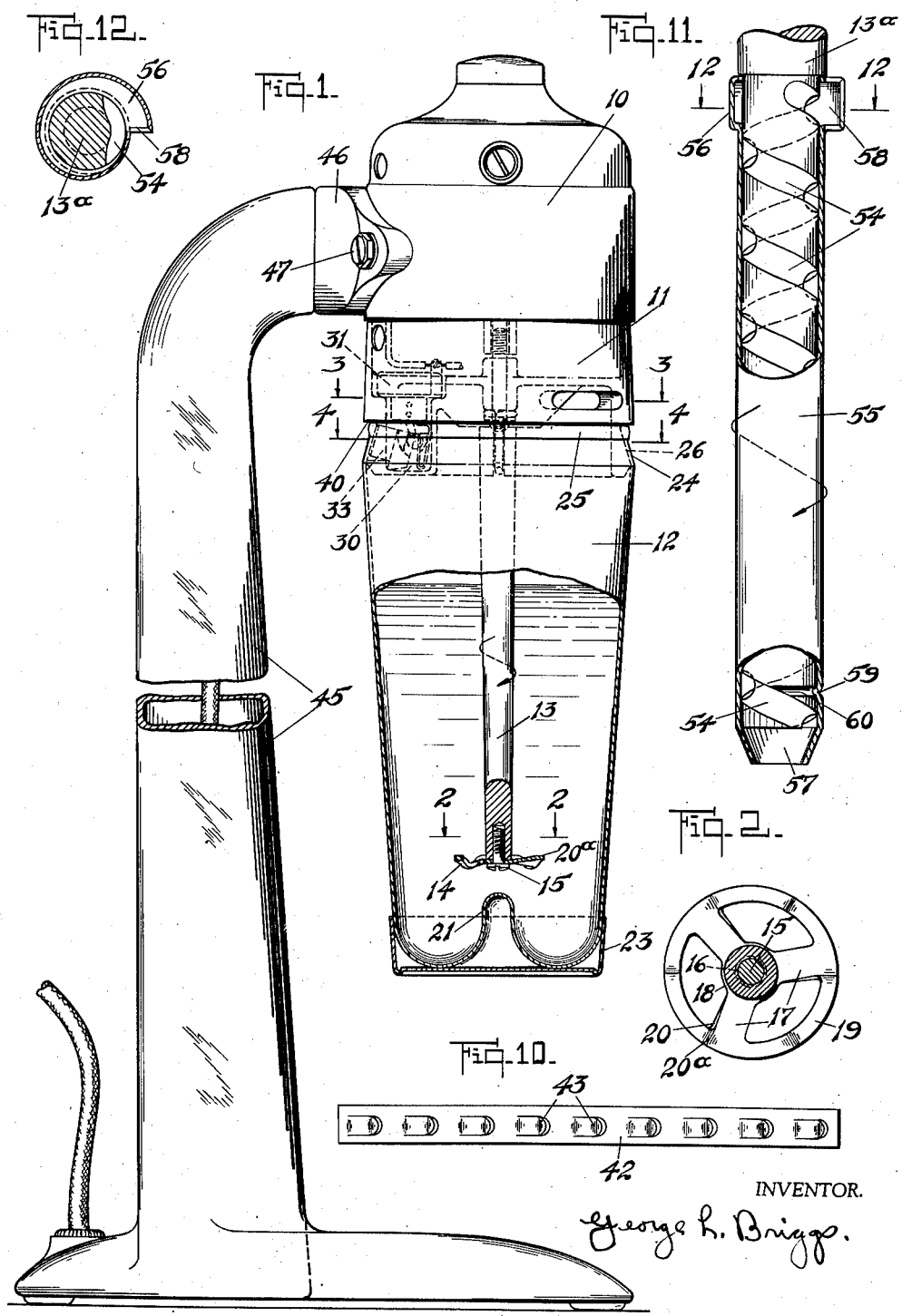

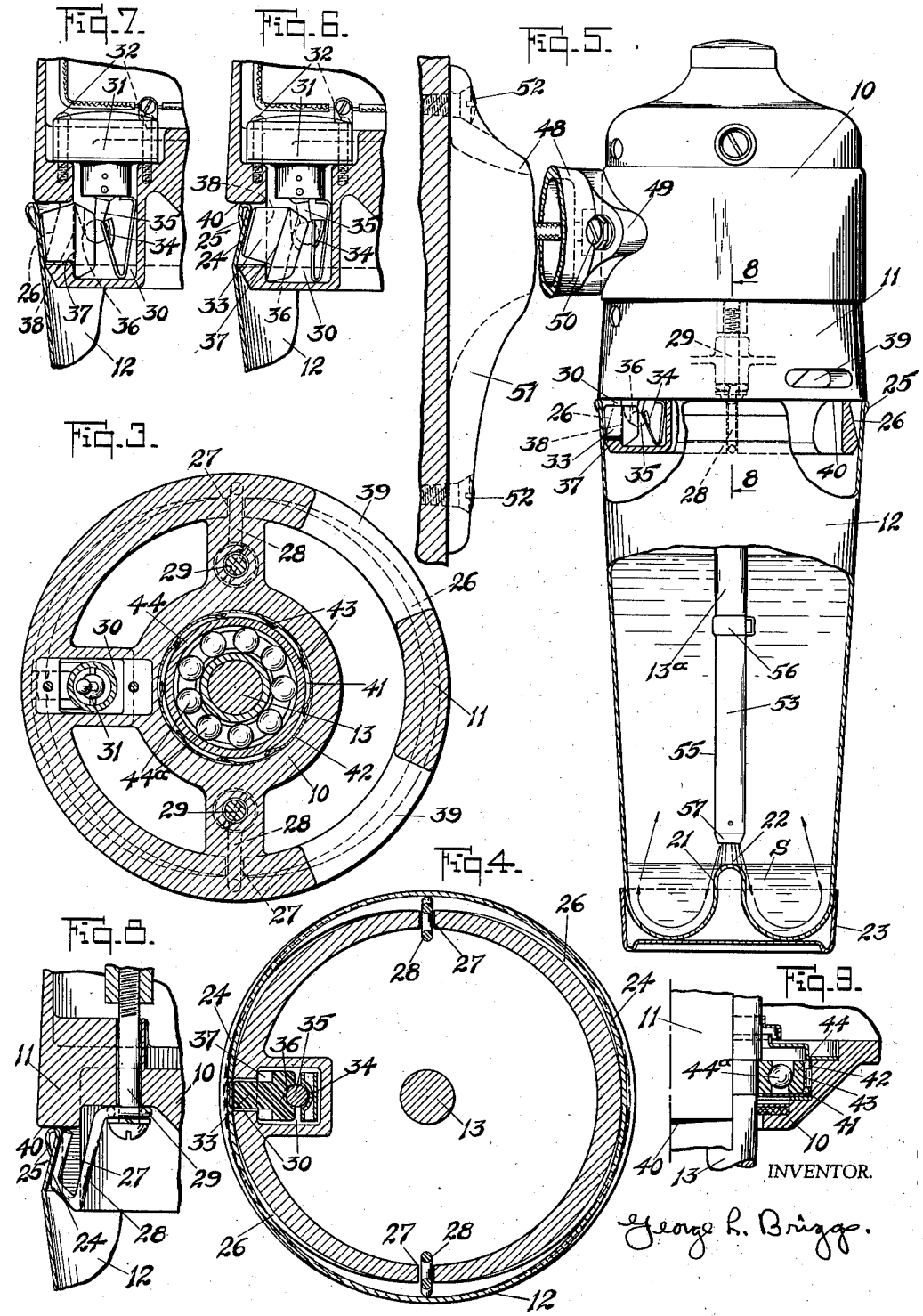

2,123,496

UNITED STATES PATENT OFFICE 2,123,496

DRINK MIXER

George L. Briggs, Oneida, N. Y.

Refile for application Serial No. 29,453, July 2, 1935. This application December 15, 1937, Serial No. 179,943

11 Claims. (Cl. 259—108)

This application is a refile for my abandoned application, Serial No. 29,453, filed July 2, 1935.

This invention relates to improvements in drink-mixers, and particularly those of the electric motor-driven type.

The object of the invention is to provide a simple, durable device which can be more easily kept clean and in a proper sanitary condition than those heretofore known, not only so far as the mixer itself is concerned, but also so far as concerns its immediate environment.

A further object is to provide such a mixer which will be particularly suitable for concoctions containing ice cream because it can be operated at a greater speed than mixers heretofore known while at the same time avoiding splashing or throwing of the contents of the mixing receptacle out of the receptacle.

With these general objects in view, an apparatus embodying the invention, broadly considered, comprises an overhead electric motor arranged to drive a depending agitator and a receptacle arranged to enclose the agitator and to be detachably connected to the motor casing, which in the best embodiment of the invention has a depending skirt, the detachable connecting means being of a sanitary type, that is to say, of such a form that it may be cleaned readily and certainly. The receptacle, in conjunction with the skirt of the motor, completely encloses the agitator, so that none of the contents of the receptacle can be thrown out of the receptacle by centrifugal force, no matter how rapidly the agitator is operated.

A further important feature of the invention is that the receptacle may be attached to the skirt of the motor without setting the motor in operation, so that when the apparatus is not in operation, the receptacle may be put in place on the skirt and thus may serve to protect the agitator against dust or insects, and, furthermore, the interior of the receptacle itself is also substantially closed and protected.

A still further feature of the invention consists of a motor having a receptacle engaging portion onto which the upper end of the receptacle may be put, within which portion of the motor the operating device of the motor starting and stopping mechanism is located so that the receptacle when first put in place will not engage the said operating device, but will be held in a position to protect the agitator, and yet by a further movement of the receptacle after it is put in place, it will actuate said operating device and start the motor. In the best embodiment of the invention the further movement is a manually produced rotary movement of the receptacle.

The best embodiment of the invention will now be more particularly described in connection with the accompanying drawings, in which Figure 1 is a side elevation, partly broken away, of a drink-mixer using a pedestal mounting, showing the receptacle in a locked and operating position;

Figure 2 is a plan view of one type of beater, taken on the line 2—2 of Figure 1, which may be used with the agitator of the kind frequently employed;

Figure 3 is a sectional view taken on the line 3—3 of Figure 1;

Figure 4 is a sectional view, taken on the line 4—4 of Figure 1, showing the receptacle in locked and operating position;

Figure 5 is a side elevation, partly in section, of a modification showing a drink-mixer having a bracket mounting and an agitator of the pressure type, with the receptacle completely enclosing the agitator and in an inoperative position;

Figure 6 is an enlarged view of the switch means in operating position;

Figure 7 is an enlarged view of the switch means in an inoperative position;

Figure 8 is a sectional view, taken on line 8—8 of Figure 5, showing means for holding the receptacle in position around the agitator when it is not in operation;

Figure 9 is a vertical fragmental view, partly in section, showing the lower motor bearing with a spring cushioning means.

Figure 10 is a developed plan view of the spring cushioning means.

Figure 11 is an enlarged elevational view, partly broken away, of an agitator of the pressure type shown in Figure 5, and Figure 12 is a sectional view taken on the line 12—12 of Figure 11.

Referring to the drawings, 10 is a motor casing, enclosing an electric motor of any usual type, having its lower portion, indicated at 11, so formed as to receive in closed relation a receptacle 12, in locked or unlocked position, so that the receptacle completely encloses an agitator shaft 13, upon which is mounted a beater 14, as by a threaded stud or machine screw 15. When the receptacle 12 has been manually rotated in either direction about the agitator shaft 13 while in closed relation with the skirt 11 of the motor casing, the receptacle 12 is locked with the skirt 11 and then comes into engagement with and actuates a switching means, which will be more fully described hereinafter, causing the motor to operate, thereby driving the shaft 13 with its beater 14 to agitate and mix the contents of the removable receptacle 12, if it contains the materials to be mixed.

The beater 14, shown in Figure 2, may be pierced and blanked out in the usual well known manner, having a central aperture 16 for receiving the stud 15, web portions 17 extending from an inner ring 18, said webs connecting with an outer ring 19, and said outer ring having, when viewed edgewise, an undulatory outline, the undulations being of even number, greater than two, connected to the inner ring 18 by the said web portions 17, each of which, in the best embodiment of the invention, has a width equal to one-third the peripheral length of one complete undulation. The number of web portions should equal one-half the number of complete undulations and said undulations are to be so formed that the leading edges 20 of each web 17 is in juxtaposition with the positive node 20a of its respective undulation. It will be obvious from the above description that a beater of this construction will have an upward thrust upon the shaft and cause a downward wash in the contents through which it rotates. While this form of beater may be employed with an ordinary receptacle with a plain bottom, to utilize this beater construction to its best advantage, it is important to provide the receptacle 12 with a centrally located, inwardly, that is, upwardly, extending portion 21, shown in Figures 1 and 5, to create a flow of liquid in a reverse direction through the initial syrup or flavoring which is always put in before the water or milk has been added and does not diffuse at once, the said flow in two directions causing the heavier liquid, such as syrup or flavoring, to become quickly distributed in the lighter liquid, water or milk, by bringing it up into the added lighter liquid.

It has been found advantageous to form this inwardly extending portion 21 integrally with the body of the receptacle 12, and in its preferred outline it is conoidal in shape; also, this inwardly extending portion 21 may be of any predetermined height desired, but in the best embodiment of the invention is of a height to provide an easily seen gauge for the insertion of the right amount of syrup of known concentration, as best shown at S in Figure 5. It will be seen from the position of this portion 21, that is, its central location, that a considerable amount of tilt from its vertical plane may be admitted without materially altering the syrup volume to be inserted in respect to the top or gauge point 22. The receptacle is provided with a dished cup 23 enclosing the semi-toroidal shaped base portion of the receptacle 12.

The top of the cup will now be described in connection with the coacting portion of the motor casing, which engages the receptacle and which may be a skirt extending downward as indicated at 11. While capable of various constructions, as here shown in its preferred form, that portion of the side wall of the receptacle 12, indicated at 24, throughout the length of its longitudinal axis of inter-engagement with skirt 11, is so designed to form a substantial ellipse in outline having axes of unequal overall dimensions, best shown in Figure 4, said wall 24 varying peripherally throughout the inter-engagement length about the common axis of interlocking. This wall, at its points of contact with the wall 26 of the skirt 11 slopes inwardly and upwardly toward the said axis, while at other points the slope is outward and upward, as will be clear from Figure 4. That portion of the skirt 11 indicated at 26 is so formed as to receive the receptacle 12 in an unlocked and inoperative position to enclose the agitator when not in use, also to receive and hold the receptacle in an interlocked and operative position when materials are to be mixed. To this end, the external wall 26 is formed as a substantial ellipse in each transverse plane, these ellipses having axes of unequal overall dimensions, said wall varying peripherally about the common axis of interlocking, throughout the length of its longitudinal axis of inter-engagement with wall 24 of receptacle 12, the slope of this wall being such that it will interlock with the receptacle. In other words, the receptacle wall which is generally conical and therefore circular in cross section at its lower part, has two diametrically opposite sides sloped inward so as to form an ellipse at the plane of its upper edge. The wall portion 26 of the skirt 11 is similar to the elliptical portion of the receptacle but reversely formed when considered in the downward direction. The major axis of the wall portion 26 of the motor will enter the major axis of the receptacle, and on rotation of the latter in either direction to bring its minor axes into coincidence with the major axes of wall portion 26, it will be locked with the motor and cannot be pulled downward because of the slopes of the engaging walls.

The skirt 11 is provided with means for holding the receptacle 12 while avoiding the necessity for rotation of the latter, and thus avoiding the chance of starting the motor. To this end slots 27 are formed in the wall 26 at its minor axis through which springs 28, mounted upon motor studs 29, extend to engage the inner face of the sloping wall 24 of the receptacle at its minor axes. It will be seen from Figures 5 and 8, that an easily achieved and close relation between the motor and receptacle may be had when the mixer is not in use, to prevent flies, dust or other extraneous material from entering the receptacle or soiling the agitator.

In order to start and stop the motor by the further movement of the receptacle after it is in place on the motor, there is provided a switch in the motor casing, this switch having an operating device which extends into the boundaries of the receptacle-engaging portion of the motor, said switch means for controlling the motor being wholly enclosed, so that the liquids or other materials to be mixed may not have entry thereto. To this end a recess 30 is formed at one end of the major axes in the wall 26, this recess extending inwardly and upwardly to receive a toggle switch 31, of a well known type, mounted within the motor base, as by screws 32. Within this recess and extending outwardly through the wall 26 is a switch actuating means, or switch operating device 33, normally having its outer edge lying within the path of the sloping walls 24 of the receptacle 12, as shown in Figures 5 and 7, this switch actuating means being normally biased to the inoperative position, as shown in Figures 5 and 7, by a spring 34, confined between the inner wall of the recess and a switch arm 35, which in turn rides within a formed groove 36 formed upon the inner side of button 33. Means are provided for limiting this movement outward and to this end button 33 is provided with flanges 37 taking bearing upon the inner wall of the recess, as at 38, Figures 5 and 7.

The skirt 11 is also provided with apertures 39 for the admittance of air to the materials while being mixed, to achieve a smooth and fluffy mixture. While these apertures may be disposed at several places about the skirt, it has been found advantageous to place them forward of the center of the skirt 11 and opening laterally so as to prevent any splashing of walls or mirrors in front of which the mixer may be placed. Also, the skirt 11 is so formed as to provide a shoulder 40, and a bead 25 is provided at the top of the receptacle, the shoulder 40 and the bead 25 abutting so as to form a substantially tight joint when the receptacle is placed upon springs 28 in an inoperative position and a limiting means for relative longitudinal movement between the skirt 11 and the receptacle 12 when interlocked.

It will be seen from the description that when the receptacle 12 is placed upon the skirt 11 with their unequal axes in coincidence, they are readily separable, but upon relative rotation in either direction, one within the other, to bring their equal axes into coincidence they are interlocked. Also, upon rotating the receptacle to bring their equal axes into coincidence, switch means 33, lying within the path of the minor axes of the receptacle 12, is depressed inwardly to cause switch arm 35 to move beyond its center, thereby closing switch 31, as shown in Figures 1 and 6. With a construction of the type disclosed and described a readily cleanable, sanitary holding and switching means are provided, eliminating objectionable external hooks and knobs common in the art. Also the switch mechanism is kept close to the motor to avoid lengthy conductive connections.

It has been found advantageous to mount the armature shaft, of which the agitator shaft is a continuation, upon ball bearings, thereby making it possible to cut down the field windings by reducing the friction over that encountered where solid bearings are used, and also permitting the use of grease instead of oil, which requires less attention, and practically obviates the chance of oil running down the shaft into the receptacle, as sometimes happens when oil is used. At the high speed at which the usual agitator shafts rotate, in mixers of the general type, there is at times a whine or noise caused by the shaft becoming bent or out of alignment. Various ways have been suggested to overcome this defect, such as spring mounting the motor casing to its holding standard or column, but the objection to this and other means is that vibration is transmitted throughout the entire motor before being absorbed, without stopping the whine or chatter. In the present construction, as shown, there is provided within the casing 10, of which the skirt 11 is an integral part, a bored recess 41, Figure 3, of a diameter sufficient to encompass a shock absorbing means, such as a spring 42 having a plurality of partly cut raised bent portions 43, these raised portions 43 taking bearing upon the outer race of a radial thrust bearing 44, having balls 44a, thereby providing central alignment of the bearing and absorption means for any shock that may be imparted to the agitator from the accidental striking of the agitator, as in the putting on or taking off of the receptacle. It will be easily seen that by this construction an inexpensive and efficient means is provided to absorb and dissipate shock, without transmitting the shock throughout the entire motor structure, because there is provided a slight lateral play in all directions radially.

The motor device is suitably mounted so as to provide room beneath it and its agitator for the ready insertion and removal of the receptacle 12. In the drawings, two ways of holding the motor in its elevated position are shown. In Figure 1, the motor casing is secured to a pedestal 45, which may be done in any desired manner. As shown, the pedestal has its upper end extended laterally, and interposed between this lateral extension and the motor casing is a flanged adapter 46, secured to the pedestal in any desired manner, having a central cored aperture, not shown, for the ready passage of an electric conductor into the motor body, said flanged adapter being so formed as to partly encircle the motor casing, which is secured to said flanged adapter, as by studs 47, of which one is shown. It will be seen from the drawings that the pedestal 45 is entirely free of any protruding studs or clips, thereby providing a perfectly smooth surface for cleanliness and sanitation.

In Figure 5, the motor casing is provided with a laterally extending arm 48 having horizontal flanges 49 partly encircling the motor casing and secured thereto by studs 50, said laterally extending arm 48 merging into a vertical flange 51 shown as secured to a wall or post, as by screws 52, said arm 48 having a centrally cored aperture through which an electric conductor may readily be passed to the motor. It will be obvious from Figure 5 that, no counter or shelf being necessary to rest the mixer upon, an economy of space may be practiced where space is at a premium.

In Figure 5 there is shown a special form of an agitator of the jet type, constituting an important feature of the invention in its best embodiment, the agitator being indicated at 53, the agitator shaft 13a having a helical groove 54 cut upon its periphery, the total height of this helical groove remaining well within the materials to be mixed. Upon and surrounding this helical groove is a sleeve 55 formed at its upper end with a volute portion 56 shown in section in Fig. 12, the lower end of the sleeve being drawn in to form a nozzle 57 to direct a jet upon the diverging portion 21 of the receptacle 12, said sleeve being held to the shaft 13a to maintain a fixed relation between the upper end of the helical groove and an intake orifice 58 of the volute. The holding means may be a detent 59 formed in the side wall of the sleeve 55 taking bearing upon and within a horizontal groove 60 cut in the lower portion of the agitator shaft. In this construction it will be seen that when the receptacle containing the liquids to be mixed is placed about the agitator and turned into operating position, the volute lies well within the liquid with its intake aperture leading in the direction of rotation. Liquid being picked up by this aperture is forced into and downward along the helical groove 54, through nozzle 57, upon the inwardly extending conoidal shaped portion 21 of the receptacle 12, said helical groove being cut left-handed when the agitator shaft rotates in a counter-clockwise rotation when viewed from the bottom, or in the reverse direction when using an agitator shaft which rotates clockwise.

While the invention has been illustrated in a construction embodying all its features in the form now preferred, and certain modifications thereof, it will be understood that the invention is not limited to the specific construction and arrangement of the parts shown, but that many modifications other than those shown and described may be made by those skilled in the art, while retaining the invention defined by the claims.

It will be noted that the means of connection of the receptacle to the motor is an important feature of the invention because by said means it is possible to avoid studs, pins, slots, or other constructions which interfere with the easy cleaning of the surfaces of the receptacle inside and out, or of the motor casing. It will be seen that in the construction shown the receptacle has a substantially circular cross-section at a transverse plane below the upper edge of the receptacle, and has an elliptical cross-section in a transverse plane above the circular cross-section. In this example, the minor axis of the said ellipse is less than the diameter of the said circular cross-section and the major axis is greater than said diameter. The wall of the receptacle slopes from the said circular cross-section to said elliptical cross-section. The motor has a receptacle-engaging surface whose conformation is similar to the conformation of the receptacle, as above specified, but the elliptical cross-section of the motor is down, and the circular cross-section above it. Also the major axis of the elliptical cross-section of the motor is about equal to the minor axis of the receptacle, and most advantageously slightly larger so that the receptacle will spring outward slightly and thus the frictional hold will be increased.

In putting the receptacle into place, the major axes of the motor and of the receptacle may be aligned, which gives plenty of clearance between the receptacle wall and the receptacle-engaging surface of the motor.

Thereafter, if it is desired to start the motor, it is only necessary to rotate the receptacle about its vertical axis, and in the present example, this can be done in either direction. This interlocks the sloping surfaces of the receptacle and motor, so that the receptacle is secure against direct downward movement. Also the switch-operating member is pushed in, thus closing the electric circuit and starting the motor.

A further feature of the invention is the elastic mounting of the motor shaft with its agitator, due to the provision of the spring ring about the ball-bearing at the bottom of the motor shaft. While an ordinary self-aligning ball-bearing may be used at the upper end of the motor shaft, it is also convenient to make the said upper bearing with the spring ring used in the lower bearing as hereinbefore shown and described.

What I claim is:

1. In a drink-mixer, the combination with an electric motor having a receptacle-engaging portion at its lower end and a motor controlling switch mechanism having an operating member located within the boundaries of the receptacle-engaging portion to be engaged and disengaged by the receptacle, said motor carrying a depending agitator arranged to be operated by the motor, of a receptacle having its upper end arranged to be rotated into locking engagement with and held by the receptacle-engaging portion of the motor, and after the first part of said rotation to encounter and operate the operating member of said switch mechanism, said receptacle enclosing said depending agitator.

2. In a drink-mixer, the combination, with a bracket, an electric motor carried by said bracket and having a receptacle-engaging portion at its lower end and a motor controlling switch mechanism having an operating member located within the boundaries of the receptacle-engaging portion to be engaged and disengaged by the receptacle, said motor carrying a depending agitator arranged to be operated by the motor, of a receptacle having its upper end arranged to be rotated into locking engagement with and held by the receptacle engaging portion of the motor, and after the first part of the rotation to encounter and operate the operating member of said switch mechanism, said receptacle enclosing said depending agitator.

3. In a drink-mixer, the combination with an electric motor having a receptacle-engaging portion at its lower end, and a toggle-switch mechanism for controlling the motor, having an operating member located within the boundaries of the receptacle-engaging portion of the motor and yieldingly held outward beyond the outer surface of the said receptacle-engaging portion, said motor carrying a depending agitator arranged to be operated by the motor, of a receptacle having its upper end arranged to be rotated into locking engagement with the receptacle-engaging portion of the motor and after the first part of the rotation to encounter and depress the operating member of the switch mechanism to start the motor, said receptacle enclosing the depending agitator.

4. In a drink-mixer, a receptacle having a substantially circular cross-section at a transverse plane below the upper edge of the receptacle and having an elliptical cross-section at a transverse plane above that where the cross-section was circular, the minor axis of the ellipse being less than the diameter of said circle and the major axis of said ellipse being greater than said diameter, the wall of said receptacle sloping from said circular cross-section to said elliptical cross-section, in combination with an electric motor having a receptacle-engaging outer surface whose conformation is similar to the conformation of the receptacle as above specified but having the major axis of its elliptical cross-section substantially equal to the said minor axis of the receptacle, whereby the receptacle can be slid upward onto the receptacle-engaging surface of the motor, when the said major axes of the receptacle and motor are in substantial alignment, and then, by rotation of the receptacle about its vertical axis, the receptacle will be held to the motor so as to be secure against downward movement, while providing a sanitary surface for the receptacle inside and out.

5. In a drink-mixer, the combination, with an electric motor having a receptacle-engaging holding member and a cooperating receptacle member, said members having interlocking sloping peripheral surfaces, one being an internal surface, the other being an external surface, said members being relatively rotatable in either direction about a common axis to effect interlocking thereof, the slopes of said surfaces, relative to the common axis, varying at the different portions of the respective peripheries.

6. In a drink-mixer, the combination, with an electric motor having a receptacle-engaging holding member and a cooperating receptacle held member, said members having interlocking sloping peripheral surfaces, one being an internal surface, the other being an external surface, said members being relatively rotatable in either direction about a common axis to effect interlocking thereof, the slopes of said surfaces, relative to the common axis, varying at the different portions of their respective peripheries, and there being for any slope measured at any point on either surface at least one other equal slope measured at another point on that surface.

7. In a drink-mixer, the combination, with an electric motor having a receptacle-engaging holding member and a cooperating receptacle held member, said members having interlocking sloping peripheral surfaces, one being an internal surface, the other being an external surface, said members being relatively rotatable in either direction about a common axis to effect interlocking thereof, the slopes of said surfaces, relative to the common axis, varying at the different portions of their respective peripheries, and said surfaces having line contact at a plurality of points when said members are interlocked.

8. In a drink-mixer, the combination, with an electric motor having a receptacle-engaging holding member and a cooperating receptacle held member, said members having interlocking sloping peripheral surfaces, one being an internal surface, the other being an external surface, said members being relatively rotatable in either direction about a common axis to effect interlocking thereof, the slopes of said surfaces, relative to the common axis, varying at the different portions of their respective peripheries, and said surfaces having line contact at a plurality of equally spaced points when said members are interlocked, each line of contact being in some plane containing said axis and sloping toward said axis in the direction opposite that in which relative movement of said members is prevented by their interlocking.

9. In a drink-mixer, an electric motor, and an agitator having a helical passage open at its upper and lower ends, in combination with a receptacle for liquid, arranged to receive the agitator and to be held in fixed relation to the motor, said receptacle being arranged to contain the entire helical passage portion of the agitator and capacitated to hold a mixture containing liquid at a normal level submerging both the openings of said helical passage.

10. In a drink-mixer, the combination, with an electric motor, means for supporting the same in an elevated position, and an annular flange immovably secured to the motor and extending downward to enclose the lower end of the motor, of an agitator depending from the motor and arranged to be operated by it, yieldable receptacle-holding means carried by the annular flange, and a receptacle arranged to receive the agitator and to slide over the annular flange and engage the yielding receptacle-holding means, whereby all parts of the agitator and the lower end of the motor are enclosed.

11. In a drink-mixer, the combination, with an electric motor, means for supporting the same in an elevated position, and an annular flange immovably secured to the motor, and extending downward to enclose the lower end of the motor, said annular flange having a receptacle engaging portion and, above that, a plurality of air-inlets, of an agitator depending from the motor and arranged to be operated by it, and a receptacle arranged to receive the agitator, said receptacle having its upper end arranged to be engaged and held by said receptacle-engaging portion of the annular flange below the air-inlets.

GEORGE L. BRIGGS.